US007746081B2

(12) United States Patent
Slaton

(10) Patent No.: US 7,746,081 B2
(45) Date of Patent: Jun. 29, 2010

(54) CABLE DETECTION METHOD AND APPARATUS

(75) Inventor: David Shannon Slaton, Huntsville, AL (US)

(73) Assignee: General Electric Company, Schenectady, NY (US)

(*) Notice: Subject to any disclaimer, the term of this patent is extended or adjusted under 35 U.S.C. 154(b) by 803 days.

(21) Appl. No.: 11/608,410

(22) Filed: Dec. 8, 2006

(65) Prior Publication Data

US 2008/0136803 A1  Jun. 12, 2008

(51) Int. Cl.
*G01R 31/02* (2006.01)

(52) U.S. Cl. ............... 324/539; 340/853.2; 324/543

(58) Field of Classification Search .............. None
See application file for complete search history.

(56) References Cited

U.S. PATENT DOCUMENTS

| 4,562,428 | A * | 12/1985 | Harman et al. ............ 340/552 |
| 6,329,983 | B1 | 12/2001 | Wang |
| 6,368,155 | B1 | 4/2002 | Bassler et al. |
| 6,618,773 | B1 | 9/2003 | Chang et al. |
| 7,342,537 | B2 * | 3/2008 | Pearson et al. ........... 342/459 |
| 2003/0174156 | A1 | 9/2003 | Katsuhara et al. |
| 2004/0027515 | A1 | 2/2004 | Itakura |
| 2009/0079433 | A1 * | 3/2009 | Eslambolchi et al. ....... 324/326 |
| 2009/0167286 | A1 * | 7/2009 | Naylor et al. ............ 324/66 |
| 2009/0232383 | A1 * | 9/2009 | Verreet ................. 382/141 |

FOREIGN PATENT DOCUMENTS

| EP | 0953895 A2 | 11/1999 |
| KR | 20050078111 A | 8/2005 |

OTHER PUBLICATIONS

European Search Report for Application No. 07122543.7; Date of Mailing: Sep. 21, 2009; 7pgs.

* cited by examiner

*Primary Examiner*—Thomas Valone
(74) *Attorney, Agent, or Firm*—Cantor Colburn LLP

(57) ABSTRACT

A cable detection apparatus includes; a plurality of conductors which transmit signal information, a detection control circuit operably connected to a first conductor of the plurality of conductors, wherein the detection control circuit outputs an output signal as a first detection signal when a predetermined signal level is detected from the first conductor and outputs a second detection signal when the predetermined signal level is not detected from the first conductor, and a multiplexer operably connected to the detection control circuit which receives one of the first and second detection signals and selects between a digital signal input and an analog signal input based on the output signal of the detection control circuit and outputs the selected signal input to a conductor of the plurality of conductors.

21 Claims, 3 Drawing Sheets

CABLE DETECTION METHOD AND APPARATUS

BACKGROUND OF THE INVENTION

1. Field of the Invention

The disclosed invention relates generally to an electronic circuit allowing detection of a cable and that cable's type and a method of detecting a cable using the electronic circuit, and in particular, to an electronic circuit which allows detection of a video cable and the determination of whether the cable is an analog or digital video cable.

2. Description of the Related Art

Computers are becoming increasingly important in nearly every aspect of daily life. They may be found in the home, in the office, and in nearly every aspect of daily life. Most computers utilize a display apparatus with which to visually communicate information to a user. The display apparatus may be a liquid crystal display ("LCD") an organic light emitting diode ("OLED") display, a cathode ray tube ("CRT") display, or any of several other well known displays.

The display apparatus is connected to the computer, typically using a video cable having one end connected to a connector on the computer an opposite end connected to another connector located on the display apparatus.

Computers have reduced in size while retaining or adding new capabilities. This has put space constraints on components of the computer. Various components have shrunk to meet smaller size requirements associated with smaller, more complex computers, including the components used to communicate with the display apparatus. The components used to communicate with the display apparatus are known as video units. Because of the reduced size requirements, most video units include only a single connector with which to connect to a display apparatus via a video cable.

The connectors on the video unit and the display apparatus typically consist of a collection of terminals as female conductor connectors, and the ends of the video cable typically consist of a corresponding number of pins as male conductor connectors which may be inserted into the terminals, making a male/female connection on both the video unit and the display apparatus. The video unit sends various components of video signals through individual holes of the female conductor connector, along the video cable, to the display apparatus.

As the uses for computers have increased, so has the amount of information which they are able to communicate. It is not uncommon to have a single computer connected to multiple display apparatuses. These multiple displays may increase the total display area available for displaying information thereon. However, due to the abovementioned space constraints, the video units typically do not have the required space to support multiple connectors with which to connect with multiple display apparatus. Therefore, the single connector on the video unit must serve as the connection to multiple display apparatus. It typically does so through the use of a split, or Y, connector video cable. The end of the Y-connector having a single branch connects to the single connector on the video unit and each of the branches on the opposite side may connect to a display apparatus.

In addition to connecting to multiple displays, the computer may be able to communicate with the display apparatus using various forms of video signals. The computer may send digital video displays to the display apparatus and the computer may send analog signals to the display apparatus. The display apparatus may be capable of receiving both digital and analog signals; however, the connector video cable is incapable of transmitting both digital and analog signals. The connector video cable typically transmits only digital or only analog signals. As mentioned above due to space requirements, the video unit of the computer typically only has one connector with which to output either type of signal.

The video cable used with a digital signal is not able to transmit an analog signal, and a video cable used with an analog signal is not able to transmit a digital signal. A user wishing to connect the computer with an analog display would use an analog video cable to connect the computer's video unit to the display apparatus; and similarly, a user wishing to connect the computer with a digital display would use a digital video cable. In addition, the user would have to set a switch position or insert a jumper on the computer, or the video unit itself, to communicate to the video unit which type of cable is connected. This requires an extra setup step for the user and presents a situation where the user may accidentally set the switch/jumper improperly. There is a need to simplify the setup procedure associated with selecting the appropriate signal to send to the attached video cable.

Various techniques have been developed to automatically differentiate which cable type is connected to a system. One method includes using a capacitor/resistor network formed by the cable and passive components on the computer. In this method, a special signal, such as the PDIAG signal, which is already defined on the off-the-shelf cable, is routed through a hole in the system to a unique pin on the cable. The unique pin is connected on one cable in such a way as to differentiate it from another cable by grounding the PDIAG signal but without interfering with previously defined usages of this signal. On another cable, the signal is routed uninterrupted from one end of the cable to the other. This allows the type of cable to be detected based on the state of the PDIAG signal on the unique pin. One substantial drawback to this method is that it requires the use of a special pin on the connector and cable just to differentiate between the two cable types. Furthermore, off-the-shelf video cables do not provide a pin for such a special signal. The use of non-standard cables and connectors increases the costs associated with the manufacture of displays and computers. Additionally, computer video units equipped with the non-standard connector are not compatible with standard display apparatus and therefore are less attractive to users.

Similarly, another method is to include a special terminal in the video unit connector and on the display apparatus connector which corresponds to a unique pin on the video cable. The terminal on the video unit connector serves to detect and identify information about the cable to the video unit. The pin's only purpose is to determine whether an analog or digital connector is attached thereto. Again, this method must use non-standard connector pinouts, which increases costs and is less attractive to users.

Another method of automatically differentiating which cable type is connected to the video unit is to embed mechanical switches into the connector of the video unit. These switches, often called microswitches, are physically triggered by the insertion of the video cable into the video unit. This method requires the addition of switches to the video unit, which may increase its size beyond practical limitations. The switches are prone to deterioration with time since they work on a mechanical basis and contain several small, precision made parts. Because of those miniature precision parts, the switches also increase the cost of the video unit on which they are located.

Accordingly, a method and apparatus for simplifying the setup procedure associated with selecting the appropriate signal to send to the attached video cable without using microswitches or non-standard connectors is desired.

BRIEF DESCRIPTION OF THE INVENTION

Disclosed herein is an apparatus and method for detecting a cable connection. According to one exemplary embodiment a cable detection apparatus includes; a plurality of conductors which transmit signal information, a detection control circuit operably connected to a first conductor of the plurality of conductors, wherein the detection control circuit outputs an output signal as a first detection signal when a predetermined signal level is detected from the first conductor and outputs a second detection signal when the predetermined signal level is not detected from the first conductor, and a multiplexer operably connected to the detection control circuit which receives one of the first and second detection signals and selects between a digital signal input and an analog signal input based on the output signal of the detection control circuit and outputs the selected signal input to a conductor of the plurality of conductors.

Further disclosed herein is an exemplary embodiment of a cable detection apparatus wherein the multiplexer includes a plurality of multiplexers operably connected to the detection control circuit, each multiplexer receives one of the first and second detection signals and each of the plurality of multiplexers selects between one of a plurality of digital signal inputs and one of a plurality of analog signal inputs based on the output signal of the detection control circuit and outputs the selected signal inputs to a respective conductor of the plurality of conductors, except the first conductor.

Further disclosed herein is an exemplary embodiment of a cable detection apparatus wherein the predetermined signal level is a voltage level.

Further disclosed herein is an exemplary embodiment of a cable detection apparatus wherein the voltage level is a ground voltage.

Further disclosed herein is an exemplary embodiment of a cable detection apparatus wherein the multiplexers select one of the plurality of analog signals when they receive the first detection signal.

Further disclosed herein is an exemplary embodiment of a cable detection apparatus wherein the detection apparatus further includes; a switch operably connected to the detection control circuit, wherein the switch operably connects the first conductor to a ground voltage when the ground signal is detected.

Further disclosed herein is an exemplary embodiment of a cable detection apparatus wherein the detection apparatus further includes; a reset line operably connected to the detection control circuit, wherein when the reset line sends a reset signal to the detection control circuit, and the detection control circuit sets the multiplexer and the switch to default states.

Further disclosed herein is an exemplary embodiment of a cable detection apparatus wherein the detection control circuit detects the predetermined signal level as a voltage of the first conductor prior to the reset signal becoming inactive.

Further disclosed herein is an exemplary embodiment of a cable detection apparatus wherein the digital signal inputs are digital video signals and the analog signal inputs are analog video signals.

Further disclosed herein is an exemplary embodiment of a cable detection apparatus wherein the plurality of conductors send signals to two or more display apparatus.

Further disclosed herein is an exemplary embodiment of a cable detection apparatus wherein the conductors comprise one part of a plug and display interface connector.

Also disclosed herein is a method of detecting a cable connection. According to one exemplary embodiment a method of detecting a cable connection includes; receiving a signal from a first conductor of a plurality of conductors, inputting the signal into a detection control circuit, outputting a first detection signal from the detection control circuit when a predetermined signal level is detected from the first conductor and outputting a second detection signal from the detection control circuit when the first signal level is not detected from the first conductor, operably connecting one of an analog signal input and a digital signal input to at least one of the plurality of conductors, except the first conductor, when the first detection signal is received by a multiplexer, and operably connecting the other signal input to at least one of the plurality of conductors, except the first conductor, when the second detection signal is received by the multiplexer.

Further disclosed herein is an exemplary embodiment of a method of detecting a cable connection further including; operably connecting a plurality of analog signal inputs to the plurality of conductors, respectively, except the first conductor, when the first detection signal is received by a plurality of multiplexers, and operably connecting a plurality of digital signal inputs to the plurality of conductors, respectively, except for the first conductor, when the first detection signal is received by the plurality of multiplexers.

Further disclosed herein is an exemplary embodiment of a method of detecting a cable connection wherein the first signal level is a voltage level.

Further disclosed herein is an exemplary embodiment of a method of detecting a cable connection wherein the voltage level is a ground voltage.

Further disclosed herein is an exemplary embodiment of a method of detecting a cable connection further including connecting the first conductor to a ground voltage with a switch when the first detection signal is output from the detection control circuit.

Further disclosed herein is an exemplary embodiment of a method of detecting a cable connection further including; outputting a third detection signal from the detection control circuit when a reset signal is received at the detection control circuit, placing the multiplexers in a default state when the third detection signal is received by the plurality of multiplexers, placing the switch in a default state when the third detection signal is output by the detection control circuit.

Also disclosed herein is a cable detecting system for automatically detecting a cable, the system including; a computer comprising a video unit, the video unit including; a cable detection circuit, wherein the cable detection circuit includes; a plurality of conductors which transmit signal information, a detection control circuit operably connected to a first conductor of the plurality of conductors, wherein the detection control circuit outputs an output signal as a first detection signal when a predetermined signal level is detected from the first conductor and outputs a second detection signal when the predetermined signal level is not detected from the first conductor, and a multiplexer operably connected to the detection control circuit which receives one of the first and second detection signals and selects between a digital signal input and an analog signal input based on the output signal of the detection control circuit and outputs the selected signal input to a conductor of the plurality of conductors.

Further disclosed herein is an exemplary embodiment of a cable detecting system for automatically detecting a cable wherein the multiplexer includes a plurality of multiplexers operably connected to the detection control circuit, each multiplexer receives one of the first and second detection signals and each of the plurality of multiplexers selects between one of a plurality of digital signal inputs and one of a plurality of analog signal inputs based on the output signal of the detection control circuit and outputs the selected signal inputs to a respective conductor of the plurality of conductors, except the first conductor.

Further disclosed herein is an exemplary embodiment of a cable detecting system for automatically detecting a cable wherein the predetermined signal level is a voltage level.

Further disclosed herein is an exemplary embodiment of a cable detecting system for automatically detecting a cable wherein the voltage level is a ground voltage.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

The disclosure of the present invention relates to an apparatus and method for detecting the presence of a cable and determining that cable's type, including standard connector cables as known in the art, but is not limited thereto. An exemplary embodiment of the present invention relates to an apparatus and method for determining whether an analog or digital cable is connected to a video unit of a computer. In particular, the apparatus and method may be utilized for dual analog or dual digital cable detection. However, the present invention is not limited thereto, but may be applied to any cable detection mechanism wherein different cable types can be connected to the same connector.

Figure 1:
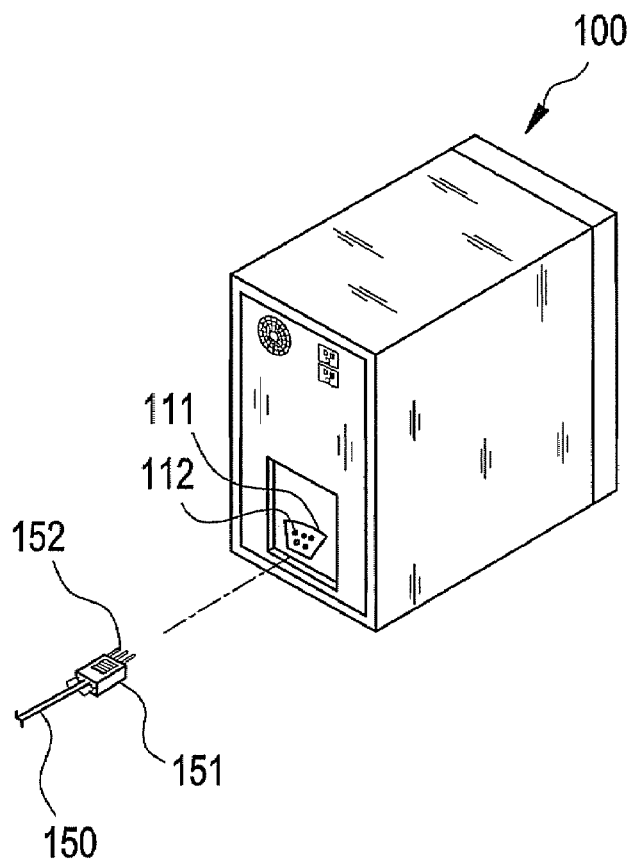
FIG. 1 is a top perspective view of a computer utilizing an exemplary embodiment of a cable detection circuit illustrating a connection of a video cable and video unit connector according to the present invention.
Figure 2:
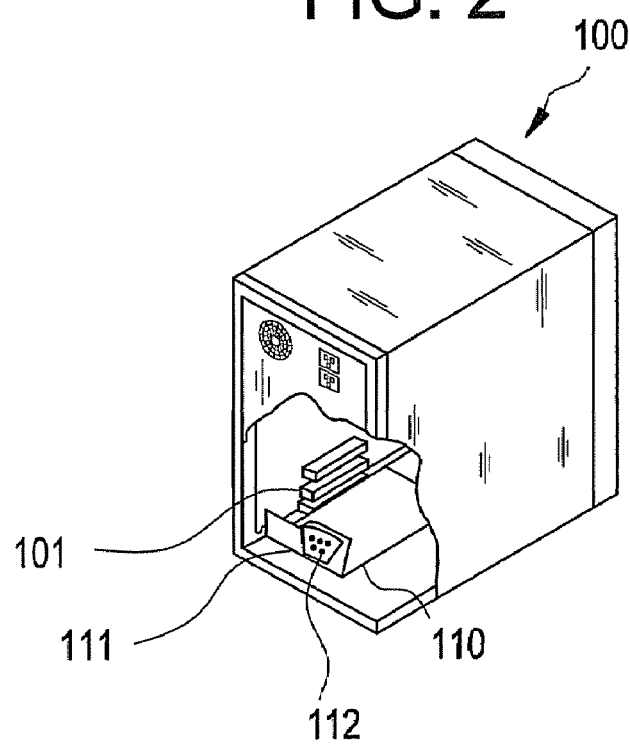
FIG. 2 is a cut-away view of the computer shown in FIG. 1 illustrating the connection between the video unit and the computer.

Referring now to FIGS. 1 and 2, FIG. 1 is a top perspective view of a computer utilizing an exemplary embodiment of a cable detection circuit illustrating a connection of a video cable and video unit connector according to the present invention. FIG. 2 is a cut-away view of the computer shown in FIG. 1 illustrating the connection between the video unit and the computer.

In FIG. 1, a computer 100 includes a video unit connector 111 which connects to a video cable connector 151 which in turn is attached to a video cable 150. According to this exemplary embodiment the video unit connector 111 includes a plurality of terminals 112 and the video cable connector 151 includes a plurality of pins 152 corresponding to the plurality of terminals. Exemplary embodiments of the present invention include configurations wherein the number of pins 152 exactly matches the number of terminals 112 and configurations wherein the numbers of pins 152 and terminals 112 differ. The shape of the video unit connector 111, and the positioning of the terminals 112 therein corresponds to the shape of the video cable connector 151 and the positioning of the pins 152 therein so that a physical and electrical connection may be made between the pins 152 and the terminals 112.

In FIG. 2 a cut-away view of the computer 100 shows a connection between a video unit 110 and the computer 100. As shown in FIG. 2, the video unit connector 111 is disposed on a video unit 110 which is connected to the computer 100. The video unit 110 may be used to send either digital video signals or analog video signals through the same video unit connector 111. Therefore, the terminals 112 of the video unit connector have multiple functions. In one configuration the terminals 112 transmit analog signals, and in an alternative configuration the same terminals 112 transmit digital signals. The terminals 112 are connected to conductors (shown in FIG. 3) on the video unit 110.

The video unit 110 may be connected to the computer using various techniques including the use of a peripheral component interconnect ("PCI") slot 101 disposed on the computer and video unit pins 113 disposed on the video unit 110. Although a PCI interface is shown, alternative interfaces are within the scope of the present invention. The video unit 110 includes an exemplary embodiment of a cable detection circuit 300 (FIG. 3) according to the present invention. In another exemplary embodiment of the present invention the cable detection circuit 300 may be integrated directly into the computer (not shown) thereby eliminating the need for a separate video unit 110. In such an alternative exemplary embodiment the video cable connector 151 connects to a video unit connector 111 directly connected to the computer 100 and the exemplary embodiment of a cable detection circuit 300 is incorporated therein.

Figure 3:
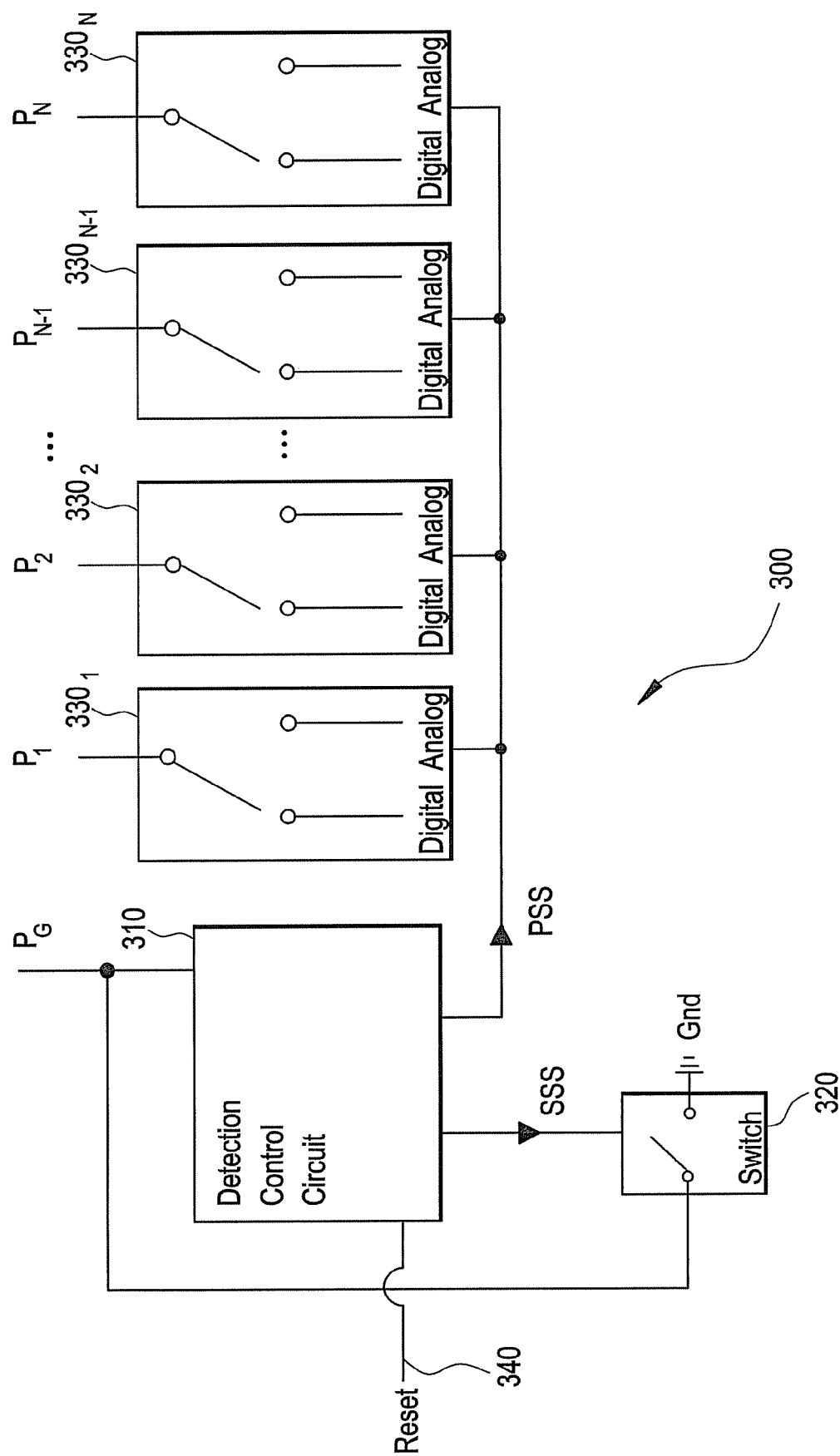
FIG. 3 is a circuit schematic block diagram of an exemplary embodiment of a cable detection circuit.

A circuit schematic block diagram of an exemplary embodiment of a cable detection circuit 300 is shown in FIG. 3. A cable detection circuit 300 includes a detection control circuit 310, a switch 320, a plurality of multiplexers $330_1$ through $330_N$, and a plurality of conductors $P_1$ through $P_N$. In one exemplary embodiment, the conductors $P_1$ through $P_N$ may be made of a conductive material such as silver, but is not limited thereto. The conductors $P_1$ through $P_N$ are connected to the terminals 112 of the video unit connector 111 and send information signals, e.g., video display information, from the computer 100 to a display (not shown). In another exemplary embodiment the male/female connectors of the video unit and the cable may be reversed, e.g., the conductors $P_1$ through $P_N$ may be connected to pins (not shown) which plug into terminals (not shown) on a cable connector. The conductors $P_1$ through $P_N$ may output to pins, terminals, or various other connectors depending on the particular arrangement of the video unit 110 and cable 150.

In an exemplary embodiment of the present invention, the cable detection circuit 300 determines which type of connector is connected thereto by detecting whether a particular conductor, $P_G$, of the plurality of conductors $P_1$ through $P_N$ is connected through the video cable 150 to a ground voltage or whether it has a free-floating voltage. The conductor $P_G$ is selected from the plurality of conductors $P_1$ through $P_N$ to be a conductor which is grounded in one configuration of the video unit, e.g., an analog configuration, and has a specific voltage in a different configuration, e.g., a digital configuration. Although the current exemplary embodiments are described as differentiating one type of connector from another by detecting a ground voltage other predetermined signal levels or voltages may be used, e.g., a reference voltage other than ground. For example, entirely different electrical characteristics of the electrical signal may be used to differentiate the connectors, e.g., the current or frequency of the electrical signals, or a digital signal can be transmitted on the signal to indicate connector type.

The detection control circuit 310 is electrically connected to the switch 320, the conductor $P_G$ and the plurality of multiplexers $330_1$ through $330_N$. The switch 320 is electrically connected to the conductor $P_G$. The multiplexers $330_1$ through $330_N$ are each connected to a conductor $P_1$ through $P_N$, respectively on one side, and may be connected to either a digital or analog input on the other side. The digital and analog inputs are connected to the video unit 110.

A reset signal is sent from the video unit 110 or the computer 100 to the detection control circuit 310 via reset signal line 340. In response to the reset signal the detection control circuit 310 places the multiplexers $330_1$ through $330_N$ in a default state. The default state of the multiplexers $330_1$ through $330_N$ includes disconnecting the conductors $P_1$ through $P_N$ from their inputs, either digital or analog. The detection control circuit 310 also sets the switch 320 in the default state in response to the reset signal. In the default state the switch 320 is not connected to ground. Eventually, the reset signal goes inactive, at which point the detection control circuit 310 latches the state of the conductor $P_G$. The detection control circuit 310 then determines whether the conductor $P_G$ is grounded, or if it has a specific voltage. Any of several well known methods may be used to compare the voltage of the conductor $P_G$ to a ground voltage. In one exemplary embodiment the detection control circuit 310 includes a comparator circuit with one input tied to conductor $P_G$ and the other input tied to a reference voltage, but the present invention is not limited thereto.

If the conductor $P_G$ is grounded the detection control circuit 310 outputs a first pin selection signal PSS to the plurality of multiplexers $330_1$ through $330_N$ causing them to select an analog input signal. The multiplexers $330_1$ through $330_N$ then connect the conductor $P_1$ through $P_N$ to the analog inputs and an analog signal is sent to the terminals 112 of the video unit connector 110. In addition, the detection control circuit 310 outputs a first switch selection signal SSS to the switch 320. In response to the first switch selection signal, the switch 320 closes to complete the connection of the conductor $P_G$ to ground, serving as a return path for the analog video signals.

If the conductor $P_G$ is not grounded, e.g., it has a free-floating voltage, the detection control circuit 310 outputs a second pin selection signal PSS to the plurality of multiplexers $330_1$ through $330_N$ causing them to select a digital input signal. The multiplexers $330_1$ through $330_N$ then connect the conductors $P_1$ through $P_N$ to the digital inputs and a digital signal is sent to the terminals 112 of the video unit connector 110. In addition, the detection control circuit 310 outputs a second switch selection signal SSS to the switch 320. In response to the second switch selection signal the switch 320 remains open, thereby not interfering with the digital video signals.

One exemplary embodiment of a cable detection circuit of the present invention is described below with reference to FIGS. 1, 2 and 4.

Figure 4:
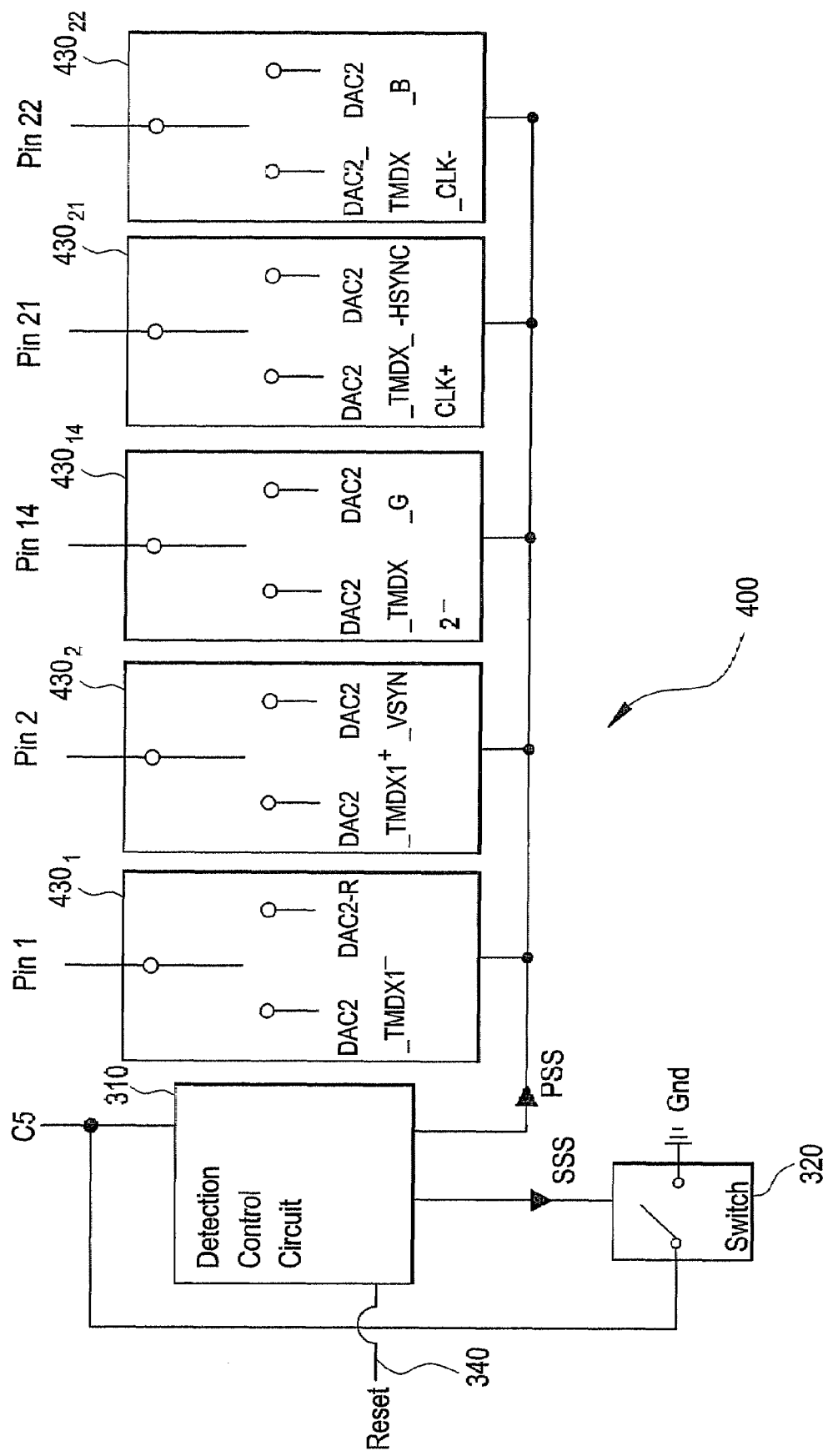
FIG. 4 is a circuit schematic block diagram of another exemplary embodiment of a cable detection circuit of the present invention.

The exemplary embodiment of a cable detection circuit 400 shown in FIG. 4 corresponds to a dual monitor plug and display ("P&D") interface connector. A P&D interface is a standard type of interface commonly used in computers which specifies connector attributes including size, shape, and pin functions. The functions assigned to the various pins of both an analog P&D connector and a digital P&D connector are listed below in Table 1.

TABLE 1

| Pin Number | Analog Function | Digital Function |
|---|---|---|
| Pin 1 | Dac2_R | Dac2_Tmdx1− |
| Pin 2 | Dac2_Vsync | Dac2_Tmdx1+ |
| Pin 3 | GND for Dac2_R | GND for Dac2_TMDX |
| Pin 4 | None specified | Dac2_Tmdx2+ |
| Pin 5 | None specified | Dac1_Tmdx_clk− |
| Pin 6 | None specified | Dac1_Tmdx0− |
| Pin 7 | None specified | Dac1_Tmdx1− |
| Pin 8 | None specified | Dac1_Tmdx2− |
| Pin 9 | GND for 5 V | GND for 5 V |
| Pin 10 | +5 V | +5 V |
| Pin 11 | None specified | Dac2_Tmdx0− |
| Pin 12 | None specified | Dac2_Tmdx0+ |
| Pin 14 | Dac2_G | Dac2_Tmdx2− |
| Pin 15 | None specified | Dac1_Tmdx_clk+ |
| Pin 16 | None specified | Dac1_Tmdx0+ |
| Pin 17 | None specified | Dac1_Tmdx1+ |
| Pin 18 | None specified | Dac1_Tmdx2+ |
| Pin 19 | Dac2_SCL | Dac2_ddc_clk |
| Pin 20 | None specified | Dac1_HPD |
| Pin 21 | Dac2_Hsync | Dac2_Tmdx_Clk+ |
| Pin 22 | Dac2_B | Dac2_Tmdx_Clk− |
| Pin 23 | GND for Dac2_B | GND for Dac2_Clk |
| Pin 24 | Dac1_Vsync | None specified |
| Pin 25 | GND for Dac2_G | GND for Dac1_Tmdx |
| Pin 26 | None specified | Dac2_HPD |
| Pin 27 | GND for Dac2_HV_Sync | GND for Dac_1 |
| Pin 28 | Dac2_SDA | Dac2_DDC_dat |
| Pin 29 | Dac1_SCL | Dac1_DDC_clk |
| Pin 30 | Dac1_SDA | Dac1_DDC_dat |
| C5 | GND | None specified |
| C4 | Dac1_Hsync | None specified |
| C3 | Dac1_B | None specified |
| C2 | Dac1-G | None specified |
| C1 | Dac1-R | None specified |

In this exemplary embodiment the conductors $P_1$ through $P_N$ correspond to the pins of the P&D connector. While many of the pins have the same or similar functions in both analog and digital modes there are several pins which perform conflicting operations in the different modes of operation. Specifically, pins 1, 2, 14, 21, and 22 have conflicting operations depending on which mode is selected, e.g., analog or digital. Pin C5 is connected to ground in the analog mode while it has a free-floating voltage in the digital mode. Pin C5 is selected to function as the particular conductor $P_G$ as discussed in the previous exemplary embodiment described above and the output to pins 1, 2, 14, 21 and 22 may be selected by a plurality of multiplexers $430_1$, $430_2$, $430_{14}$, $430_{21}$ and $430_{22}$ depending on a voltage to the pin C5 as detected by the detection control circuit.

In this exemplary embodiment the multiplexer $430_1$ selects between an analog signal Dac2_R and a digital signal Dac2_Tmdx1−, the multiplexer $430_2$ selects between an analog signal Dac2_Vsync and a digital signal Dac2_Tmdx1+, the multiplexer $430_{14}$ selects between an analog signal Dac2_G and a digital signal Dac2_Tmdx2−, the multiplexer $430_{21}$ selects between an analog signal Dac2_Hsync and a digital signal Dac2_Tmdx_Clk+ and the multiplexer $430_{22}$ selects between an analog signal Dac2_B and a digital signal Dac2_Tmdx_Clk−.

When the computer 100 is first turned on, or at other times when the detection of the type of video cable 150 connected to the video unit 110 is desired, a reset signal is sent through the reset line 340 to the detection control circuit 310. In response to the reset signal the detection control circuit sets the switch 320 to a default position wherein it is not connected to ground and sets the multiplexers $430_1$, $430_2$, $430_{14}$, $430_{21}$ and $430_{22}$ to a position where they do not connect the pins 1, 2, 14, 21 and 22 with the video or analog inputs. At a predetermined time the reset signal is inactivated and the detection control circuit 310 latches the state of the pin C5. The detection control circuit 310 then determines whether the pin C5 is connected to ground or whether it has a free floating voltage.

If the pin C5 is grounded, the detection control circuit 310 outputs a first pin selection signal PSS to the plurality of multiplexers $430_1, 430_2, 430_{14}, 430_{21}$ and $430_{22}$ causing them to select an analog input signal. The multiplexers $430_1, 430_2, 430_{14}, 430_{21}$ and $430_{22}$ then connect the pins 1, 2, 14, 21 and 22 to the analog inputs and an analog signal is sent to the terminals 112 of the video unit connector 110. In addition, the detection control circuit 310 outputs a first switch selection signal SSS to the switch 320. In response to the first switch selection signal the switch 320 closes to complete the connection of the pin C5 to the ground, serving as a return path for the analog video signals.

If the pin C5 is not grounded, e.g., it has a free-floating voltage, the detection control circuit 310 outputs a second pin selection signal PSS to the plurality of multiplexers $430_1, 430_2, 430_{14}, 430_{21}$ and $430_{22}$ causing them to select a digital input signal. The multiplexers $430_1, 430_2, 430_{14}, 430_{21}$ and $430_{22}$ then connect the pins 1, 2, 14, 21 and 22 to the digital inputs and a digital signal is sent to the terminals 112 of the video unit connector 110. In addition, the detection control circuit 310 outputs a second switch selection signal SSS to the switch 320. In response to the second switch selection signal the switch 320 remains open, thereby not interfering with the digital video signals.

Advantages of exemplary embodiments of the present invention may include: detecting the type of cable connected to a video output connector without user intervention such as setting jumpers and permitting automatic output of appropriate video signals. The exemplary embodiments of the present invention require no user intervention other than connecting the cable to the video connector and they require no changes to the standard analog or digital video connectors. There are no dedicated conductors or mechanical switches for the purpose of cable detection. The exemplary embodiments allow for cable detection using the existing signal definitions of the conductors of the cables.

While the embodiments of the disclosed method and system have been described with reference to exemplary embodiments, it will be understood by those skilled in the art that various changes may be made and equivalents may be substituted for elements thereof without departing from the scope of the embodiments of the disclosed method and system. In addition, many modifications may be made to adapt a particular situation or material to the teachings of the embodiments of the disclosed method and system without departing from the essential scope thereof. Therefore, it is intended that the embodiments of the disclosed method and system not be limited to the particular embodiments disclosed as the best mode contemplated for carrying out the embodiments of the disclosed method and system, but that the embodiments of the disclosed method and system will include all embodiments falling within the scope of the appended claims.

What is claimed is:

1. A cable detection apparatus comprising:
    a plurality of conductors which transmit signal information;
    a detection control circuit operably connected to a first conductor of the plurality of conductors, wherein the detection control circuit outputs an output signal as a first detection signal when a predetermined signal level is detected from the first conductor and outputs a second detection signal when the predetermined signal level is not detected from the first conductor; and
    a multiplexer operably connected to the detection control circuit which receives one of the first and second detection signals and selects between a digital signal input and an analog signal input based on the output signal of the detection control circuit and outputs the selected signal input to a conductor of the plurality of conductors.

2. The cable detection apparatus of claim 1, wherein the multiplexer includes a plurality of multiplexers operably connected to the detection control circuit, each multiplexer receives one of the first and second detection signals and each of the plurality of multiplexers selects between one of a plurality of digital signal inputs and one of a plurality of analog signal inputs based on the output signal of the detection control circuit and outputs the selected signal inputs to a respective conductor of the plurality of conductors, except the first conductor.

3. The cable detection apparatus of claim 1, wherein the predetermined signal level is a voltage level.

4. The cable detection apparatus of claim 3, wherein the voltage level is a ground voltage.

5. The cable detection apparatus of claim 2, wherein the multiplexers select one of the plurality of analog signals when they receive the first detection signal.

6. The cable detection apparatus of claim 1, further comprising:
    a switch operably connected to the detection control circuit,
    wherein the switch operably connects the first conductor to a ground voltage when the ground signal is detected.

7. The cable detection apparatus of claim 6, further comprising:
    a reset line operably connected to the detection control circuit,
    wherein when the reset line sends a reset signal to the detection control circuit, and the detection control circuit sets the multiplexer and the switch to default states.

8. The cable detection apparatus of claim 7, wherein the detection control circuit detects the predetermined signal level as a voltage of the first conductor when the reset signal is inactive.

9. The cable detection apparatus of claim 2, wherein the digital signal inputs are digital video signals and the analog signal inputs are analog video signals.

10. The cable detection apparatus of claim 9, wherein the plurality of conductors send signals to two or more display apparatus.

11. The cable detection apparatus of claim 1, wherein the conductors comprise one part of a plug and display interface connector.

12. A method of detecting a cable connection, the method comprising:
    receiving a signal from a first conductor of a plurality of conductors;
    inputting the signal into a detection control circuit;
    outputting a first detection signal from the detection control circuit when a predetermined signal level is detected from the first conductor and outputting a second detection signal from the detection control circuit when the first signal level is not detected from the first conductor;
    operably connecting one of an analog signal input and a digital signal input to at least one of the plurality of conductors, except the first conductor, when the first detection signal is received by a multiplexer; and
    operably connecting the other signal input to at least one of the plurality of conductors, except the first conductor, when the second detection signal is received by the multiplexer.

13. The method of claim 12 further comprising:
operably connecting a plurality of analog signal inputs to the plurality of conductors, respectively, except the first conductor, when the first detection signal is received by a plurality of multiplexers; and
operably connecting a plurality of digital signal inputs to the plurality of conductors, respectively, except for the first conductor, when the first detection signal is received by the plurality of multiplexers.

14. The method of claim 12 wherein the first signal level is a voltage level.

15. The method of claim 14 wherein the voltage level is a ground voltage.

16. The method of claim 12, further comprising:
connecting the first conductor to a ground voltage with a switch when the first detection signal is output from the detection control circuit.

17. The method of claim 16 further comprising:
outputting a third detection signal from the detection control circuit when a reset signal is received at the detection control circuit;
placing the multiplexers in a default state when the third detection signal is received by the plurality of multiplexers;
placing the switch in a default state when the third detection signal is output by the detection control circuit.

18. A cable detecting system for automatically detecting a cable, the system comprising:
a computer comprising a video unit, the video unit comprising:
a cable detection circuit,
wherein the cable detection circuit comprises:
a plurality of conductors which transmit signal information;
a detection control circuit operably connected to a first conductor of the plurality of conductors, wherein the detection control circuit outputs an output signal as a first detection signal when a predetermined signal level is detected from the first conductor and outputs a second detection signal when the predetermined signal level is not detected from the first conductor; and
a multiplexer operably connected to the detection control circuit which receives one of the first and second detection signals and selects between a digital signal input and an analog signal input based on the output signal of the detection control circuit and outputs the selected signal input to a conductor of the plurality of conductors.

19. The cable detecting system for automatically detecting a cable of claim 18, wherein the multiplexer includes
a plurality of multiplexers operably connected to the detection control circuit, each multiplexer receives one of the first and second detection signals and each of the plurality of multiplexers selects between one of a plurality of digital signal inputs and one of a plurality of analog signal inputs based on the output signal of the detection control circuit and outputs the selected signal inputs to a respective conductor of the plurality of conductors, except the first conductor.

20. The cable detecting system for automatically detecting a cable of claim 18, wherein the predetermined signal level is a voltage level.

21. The cable detecting system for automatically detecting a cable of claim 15, wherein the voltage level is a ground voltage.

* * * * *